United States Patent
Hatakeyama et al.

(10) Patent No.: US 7,179,510 B2
(45) Date of Patent: Feb. 20, 2007

(54) METHOD FOR FORMING LIQUID CRYSTAL DISPLAY COMPRISING MANUFACTURING LIGHT-SHIELDING FILM BY APPLYING COATING LIQUID CONTAINING FINE METAL PARTICLES ONTO SUBSTRATE AND DRYING THE SAME

(75) Inventors: Akira Hatakeyama, Shizuoka-ken (JP); Hidenori Gotoh, Shizuoka-ken (JP); Hideaki Ito, Shizuoka-ken (JP)

(73) Assignee: Fuij Photo Film Co., Ltd., Kanagawa (JP)

( * ) Notice: Subject to any disclaimer, the term of this patent is extended or adjusted under 35 U.S.C. 154(b) by 335 days.

(21) Appl. No.: 10/825,657

(22) Filed: Apr. 16, 2004

(65) Prior Publication Data

US 2004/0239842 A1 Dec. 2, 2004

(30) Foreign Application Priority Data

Apr. 18, 2003 (JP) ............................. 2003-113612

(51) Int. Cl.
G02F 1/1333 (2006.01)
G03C 1/00 (2006.01)
B32B 5/16 (2006.01)

(52) U.S. Cl. ................ 428/1.1; 428/1.5; 428/1.6; 428/323; 349/106; 349/110; 430/270.1; 430/281.1; 430/325

(58) Field of Classification Search ................ 349/106, 349/110; 428/1.1, 1.5, 1.6, 323; 430/270.1, 430/281.1, 325; 257/294, 435, E31.122
See application file for complete search history.

(56) References Cited

U.S. PATENT DOCUMENTS

| 5,686,980 | A | * | 11/1997 | Hirayama et al. ........... 349/110 |
| 5,933,208 | A | * | 8/1999 | Kim ........................... 349/106 |
| 6,001,533 | A | * | 12/1999 | Sega et al. ................ 430/270.1 |
| 7,045,257 | B2 | * | 5/2006 | Hatakeyama et al. .......... 430/7 |

FOREIGN PATENT DOCUMENTS

| JP | 62-009301 A | 1/1987 |
| JP | 05-303090 A | 11/1993 |

OTHER PUBLICATIONS

Semiconductor Equipment and Materials International, *Color TFT Liquid Crystal Display*, Kyoritsu Shuppan Co., Ltd., Jul. 20, 1996, pp. 218-220.

* cited by examiner

*Primary Examiner*—Shean C Wu
(74) *Attorney, Agent, or Firm*—Sughrue Mion, PLLC

(57) ABSTRACT

The present invention provides a method for forming a liquid crystal display comprising: providing a liquid crystal display substrate; and forming a light-shielding film for a display on the liquid crystal display substrate by coating the liquid crystal display substrate with a coating liquid containing a binder and fine metal particles, such as fine silver particles, dispersed in the binder, and optionally a dispersant by use of a spin coat method, a curtain coat method, or an extrusion method, and drying the resultant layer, and optionally forming a protective layer on the layer and exposing the protective layer to light.

19 Claims, No Drawings

METHOD FOR FORMING LIQUID CRYSTAL DISPLAY COMPRISING MANUFACTURING LIGHT-SHIELDING FILM BY APPLYING COATING LIQUID CONTAINING FINE METAL PARTICLES ONTO SUBSTRATE AND DRYING THE SAME

CROSS-REFERENCE TO RELATED APPLICATION

This application claims priority under 35 U.S.C. 119 from Japanese Patent Application No. 2003-113612, the disclosure of which is incorporated by reference herein.

BACKGROUND OF THE INVENTION

1. Field of the Invention

The present invention relates to a method for forming a liquid crystal display including a color filter with a light-shielding film.

2. Description of the Related Art

A light-shielding film is a black edge portion formed, in order to prevent light from leaking, around red, blue and green pixels of a color filter and around the color filter, and a dot-like or linear black pattern for shielding a thin film transistor (TFT) from light.

In a color filter used in a color liquid crystal display, pigmented pixel layers having red (R), green (G) or blue (B) color are formed on a transparent substrate. Moreover, in order to improve display contrast, a light-shielding film for a display is formed in gaps between the respective pigmented pixels of red, green and blue. In particular, in a liquid crystal display element of an active matrix drive system that includes a thin film transistor (TFT), in order to prevent image quality from deteriorating owing to an electric current leakage in the thin film transistor caused by light, the light-shielding film for a display is required to have high light-shielding property (optical density).

In order to manufacture a light-shielding film for a display with high light-shielding property, usage of metal has been considered. As a technique for manufacturing a light-shielding film for a display using fine metal particles, a technique for generating fine nickel particles in a layer by using a plating technique has already been disclosed (Japanese Patent Application Laid-Open (JP-A) No. 5-303090).

However, the method requires complicated operations of precipitating fine particles from a plating solution containing metal ions. Moreover, processing of a waste plating solution is also complicated and greatly affects the environment.

On the other hand, a method for manufacturing a light-shielding film for a display that does not use the plating technique is known. An example thereof is a technique of forming a light-shielding film for a display by using carbon black in place of fine metal particles (JP-A No. 62-9031).

However, carbon black has lower optical density per unit coating amount than fine metal particles. Accordingly, when high light-shielding property and optical density are ensured, a film inevitably becomes thicker. Therefore, when red, blue and green pixels are formed after formation of the light-shielding film for a display, uniform pixels are difficult to form.

Furthermore, as another technique in which a light-shielding film for a display is formed by using a plating technique, a method in which a metal thin film is formed by using a vacuum evaporation method or a sputtering method, whereby a photoresist is coated on the metal thin film, exposed to light through a photomask having the pattern of a light-shielding film for a display and developed, exposed areas of the metal thin film are etched, and the resist layer on the light-shielding film for a display is removed (See "*Color TFT Liquid Crystal Display*", Kyoritsu Shuppan Co., Ltd, Jul. 20, 1996, pp. 218–220) can be used to form a film of a metal such as chromium as a light-shielding layer.

Since a metal film is used in the method, high light-shielding property can be obtained even if a film thickness is small. However, since the method requires usage of the vacuum evaporation method or the sputtering method which involves vacuum deposition processes and etching processes, costs increase and measures are necessary to prevent adverse influence on the environment. Furthermore, the metal film has high reflectance, and therefore display contrast decreases under strong ambient light. In order to prevent such a problem, a chromium film having a low reflectance (one made of two layers of chromium metal and chromium oxide) can be used; however, further cost increases are incurred.

A method for forming a light-shielding film including fine metal sulfide particles by using plating is known (See JP-A No. 7-218715). However, since the method also uses a plating technique, the method also has a problem of a waste solution affecting the environment and requires complicated processes, and is therefore unsatisfactory.

Accordingly, there is a need for an inexpensive method for manufacturing a thin light-shielding film for a display with high light-shielding performance.

SUMMARY OF THE INVENTION

The inventors of the invention eagerly studied in consideration of the above need, and have found that a method in which a coating liquid including fine metal particles and a binder is applied to a substrate, and drying the resultant coating, can satisfy the above need.

A first aspect of the invention provides a method for forming a liquid crystal display comprising: providing a liquid crystal display substrate (hereinafter simply referred to as a "substrate"); and forming a light-shielding film for a display on the liquid crystal display substrate by coating the liquid crystal display substrate with a coating liquid including a binder and fine metal particles dispersed in the binder, followed by drying.

A second aspect of the invention provides a method for forming a liquid crystal display comprising: providing a liquid crystal display substrate; and forming a light-shielding film for a display on the liquid crystal display substrate by coating the liquid crystal display substrate with a coating liquid containing a binder, fine metal particles dispersed in the binder and a dispersant, followed by drying.

A third aspect of the invention provides a method for forming a liquid crystal display comprising: providing a liquid crystal display substrate; and forming a light-shielding film for a display on the liquid crystal display substrate by coating the liquid crystal display substrate with a coating liquid containing a binder, fine metal particles dispersed in the binder and a dispersant, drying an obtained layer, forming a protective layer on the obtained layer, and exposing the protective layer to light.

The invention can provide a thin light-shielding film for a display with high optical density without using a plating technique that involves complicated steps and needs measures to prevent adverse influence on the environment and a vacuum technique whose cost is high.

DETAILED DESCRIPTION OF THE INVENTION

Coating Liquid Containing Fine Metal Particles

A coating liquid used in a method of the invention includes a binder and fine metal particles dispersed in the binder, and optionally a dispersant and a solvent.

Metal Fine Particles

Although there is no specific restriction on the type of metal for the fine metal particles used in the invention, preferable examples thereof include nickel, silver, gold, platinum, copper and an alloy thereof. Among these, silver is more preferable in view of chemical stability and cost.

The fine metal particles used in the invention may have either a homogeneous or a heterogeneous composition. An example of fine metal particles having a heterogeneous composition is one in which a surface thereof has a coating layer having a different composition from that of the inside thereof. Furthermore, there is no particular restriction on forms of the fine metal particles used in the invention, and fine metal particles with various forms such as a sphere, an infinite form, a planar form, a cube, a regular octahedron and a column can be used.

The average particle diameter of the fine metal particles used in the invention is preferably in the range of 1 to 3000 nm, more preferably in the range of 5 to 800 nm, and still more preferably in the range of 10 to 250 nm. When the average particle diameter is less than 1 nm, the absorption wavelength of the particles is short. When it exceeds 3000 nm, color tint may appear and low optical density may be obtained.

The amount of the fine metal particles included in the coating liquid is preferably 3 to 50% by weight and more preferably 10 to 30% by weight.

There is no particular restriction on a method for manufacturing the fine metal particles used in the invention, and known manufacturing methods such as gas-phase methods including an evaporation aggregation method and a gas-phase reduction method, and liquid-phase methods such as liquid-phase reduction method can be used. These methods are described in detail in "*Choubiryusi no gijutu to ouyou ni okeru saisinndoukou II*" ("*Latest Trend in Technology and Application of Ultra Fine Particles*", S.B. TECHNO-RE-SEARCH CO., LTD, 2002).

Furthermore, for example, in the case of silver fine particles (colloidal silver), conventionally known methods such as a method for reducing a soluble silver salt in an aqueous solution of gelatin with hydroquinone disclosed in U.S. Pat. No. 2,688,601, a method for reducing a refractory silver salt with hydrazine described in German Patent No. 1,096,193, a method for chemically reducing silver ions in a solution such as a method for reducing silver with tannic acid described in U.S. Pat. No. 2,921,914, a method for forming silver particles by using electroless plating described in JP-A No. 5-134358, and an in-gas evaporation method in which a bulk metal is evaporated in an inert gas such as helium and cold-trapped with a solvent can be used.

Dispersant

In order to prevent fine metal particles from coagulating in the coating liquid, the fine metal particles are preferably dispersed with a dispersant in the invention. Use of a dispersant in the dispersion of the fine metal particles makes it possible to obtain a light-shielding film for a display in which the fine metal particles are well dispersed and which has high optical density. Examples of the dispersant that can be used in the invention include surfactants and polymers.

As the surfactants, all of anionic surfactants, cationic surfactants, nonionic surfactants and amphoteric surfactants can be used. However, anionic surfactants and nonionic surfactants are particularly preferable. The HLB value of the surfactant used in the invention cannot be generally defined, and depends on whether a solvent of the coating liquid is a water system or an oil system. However, it is preferably in the range of approximately 8 to approximately 18 when the solvent is a water system, and in the range of approximately 3 to approximately 6 in the case of an oil system. HLB values are described in "*Kaimen Kasseizai Handobukku*" ("*Surfactant Handbook*", edited by Yoshida Tokiyuki et al., published by Kougakutosho Ltd., 1987).

Specific examples of the surfactants include propylene glycol monostearate, propylene glycol monolaurate, diethylene glycol monostearate, sorbitol monlaurate polyoxyethylene sorbitol monolaurate, and the surfactants described in "*Surfactant Handbook*".

The amount of the surfactant used is preferably in the range of 0.01 to 30% by weight relative to the fine metal particles, and more preferably in the range of 0.1 to 20% by weight.

The polymers used in the invention preferably have protective colloid properties. Examples of such a polymer include gelatin, polyvinyl alcohol, methylcellulose, hydroxypropylcellulose, polyalkylamine, partial alkyl esters of polyacrylic acids, and polymers described in "*Ganryou no Jitenn*" ("*Pigment Dictionary*", edited by Ito Seisirou, published by Asakura Shoten, 2000).

The amount of the polymer used is preferably in the range of 0.01 to 30% by weight relative to the fine metal particles, and more preferably in the range of 0.1 to 20% by weight.

Binder

Next, a binder used in the light-shielding film will be explained.

Examples of the binder contained in the light-shielding film in the invention include: polyvinyl alcohol; gelatin, cellulose polymers such as methyl cellulose; and acrylic or styrene-acrylic polymers made of any of methyl methacrylate, ethyl acrylate, benzyl acrylate, acrylic acid, methacrylic acid, and styrene.

Among them, alkali-soluble acrylic and styrene-acrylic polymers whose monomer(s) includes acrylic acid and/or methacrylic acid are preferable since they enable patterning with alkali development.

The total content of acrylic acid and/or methacrylic acid in the monomers of the alkali-soluble acrylic and styrene-acrylic polymers is preferably 10 to 60 mass %, and more preferably 20 to 50 mass %.

Specific examples of the acrylic and styrene-acrylic polymers include: a copolymer made of 60 mass % of benzyl methacrylate and 40 mass % of methacylic acid; a terpolymer made of 10 mass % of methyl methacrylate, 60 mass % of styrene and 30 mass % of methacrylic acid; a copolymer made of 20 mass % of methyl methacrylate, 50 mass % of styrene, 15 mass % of acrylic acid, and 15 mass % of methacylic acid; a terpolymer made of 30 mass % of benzyl methacrylate, 35 mass % of methyl methacrylate, and 35 mass % of methacrylic acid; and a terpolymer made of 60 mass % of styrene, 20 mass % of acrylic acid, and 20 mass % of methacrylic acid.

The binder may also be a monomer or an oligomer. Specific preferable examples thereof include polyfunctional acrylic monomers such as ethylene glycol (meth)acrylate, triethylene glycol di(meth)acrylate, 1,3-butanediol di(meth) acrylate, tetramethylene glycol di(meth)acrylate, propylene glycol di(meth)acrylate, trimethylolpropane tri(meth)acrylate, 1,4-hexanediol di(meth)acrylate, pentaerythritol hexa(meth)acrylate, and dipentaerithritol hexa(meth)acrylate.

The polyfunctional monomers can be cross-linked with light or heat as mentioned previously. However, it is preferable that the polyfunctional monomer(s) is photopolymerized by using, as a polymerization initiator, a halomethyl-S-triazine compound such as bis[4-[N-[4-(4,6-bistrichloromethyl-S-triazine-2-yl)phenyl]carbamoyl] phenyl]cebacate.

The light-shielding film in the invention may further contain a polymer to improve dispersion stability of fine particles. Examples of the polymer (so-called "dispersant") include polyvinyl alcohol, an acrylamide/acrylic acid copolymer, a styrene/maleic anhydride copolymer, sodium polyacrylate, and sodium alginate. Dispersants disclosed in "Pigment Dispersion Technique" (written by Kazuhiro Takabo, published by Technical Information Institute, Co., Ltd., 1999) can also be used. Among them, a hydrophobic one is particularly preferable.

The thickness of the light-shielding film in the invention is preferably 0.9 μm or less, more preferably 0.6 μm or less, and still more preferably 0.4 μm or less. Moreover, the optical density (OD) of the light-shielding film in the invention is preferably 3.3 or more, and more preferably 3.5 or more.

Solvent

A known organic solvent can be used in the invention. Particularly preferable examples of the organic solvent include methyl alcohol, isopropyl alcohol, MEK, ethyl acetate and toluene. Furthermore, water is also a preferable solvent. These solvents can be mixed, if necessary.

Substrate

A glass substrate used in a liquid crystal display device and the like is preferably used in the invention. As the glass substrates, those made of known glasses such as soda glass, low alkali glass and alkali-free glass can be used. The thickness of the substrate is preferably in the range of 0.5 to 3 mm, and more preferably in the range of 0.6 to 2 mm. Those described in, for instance, "Ekisyo Disupurei Kougaku Nyuumonn" ("Introduction to Liquid Display Engineering", Suzuki Hanani, The Nikkan ogyo Shinbun, Ltd., 1998) can also be used as the glass substrate.

Other Components of the Coating Liquid

In the invention, the coating liquid that contains the fine metal particles optionally includes a polymer other than the above polymers as a binder, a monomer, a polymerization initiator, a polymerization inhibitor, a surfactant, and a thickener.

The coating liquid containing the fine metal particles in the invention can be photosensitive. In order to have photosensitivity, the coating liquid may include a photosensitive resin composition. The photosensitive resin compositions may be those described in JP-A No. 10-160926, paragraph Nos.0016 to 0022 and 0029.

Furthermore, when the fine metal particles such as silver colloid are used as a water dispersion, it is necessary that the photosensitive resin composition is water-system. Examples of such a photosensitive resin composition include ones described in JP-A No. 8-271727, paragraph Nos.0015 to 0023, and, as commercially obtainable ones, SPP-M20™ manufactured by Toyo Gosei Co., Ltd.

Method for Manufacturing Light-Shielding Film for Display

The method of the invention includes: coating a coating liquid including the fine metal particles on a substrate and drying the resultant coating.

There is no particular restriction on the method for forming the pattern of a light-shielding film for a display.

Examples of the method for forming the pattern are described below.

(1) A method in which a substrate is coated with a photosensitive coating liquid containing the fine metal particles to form a light-shielding layer (a layer containing the fine metal particles), portions of the light-shielding layer other than a pattern are removed by exposure and development, and thereby the pattern is formed.

(2) A method in which a substrate is coated with a non-photosensitive coating liquid containing the fine metal particles to form a light-shielding layer, the light-shielding layer is coated with a photosensitive-resist liquid to form a resist layer, a pattern is formed through exposure and development, unnecessary portions of the light-shielding layer on which the resist layer does not exist are dissolved to form a pattern in the light-shielding layer, the resist layer is removed, and thereby a light-shielding film for a display is formed.

(3) A method in which a coated layer is formed in advance on portions of a substrate other than a pattern, the substrate is coated with a non-photosensitive coating liquid containing the fine metal particles to form a light-shielding layer, and the coated layer is removed along with portions of the light-shielding layer thereon.

Coating

In the invention, there is no particular restriction on the method for coating a substrate with a coating liquid. A spin coat method, a curtain coat method, and an extrusion method described in, for instance, JP-A No. 5-224011 can be used.

In the spin coat method, a coating liquid is dropped on a rotating substrate and spread on the entire surface of the substrate by use of centrifugal force.

The curtain coat method is one of slot orifice coating methods also called a "flow coat method". In this method, a coating liquid is dropped through a slit like a curtain and applied to the substrate. Either of the slit or the substrate moves horizontally and thereby the coating liquid is spread on the entire surface of the substrate as an even thin layer.

The extrusion method is also called the "extrusion coat method", wherein a coating liquid extruded from a slit is directly spread on a moving substrate.

Details of the coating methods mentioned above are described in, for example, "Kotingu Gijutu" ("Coating Technique", supervised by Harasaki Yuji, published by Sogogijyutu Center, 1983).

Exposure

A light source used for the exposure is chosen according to the photosensitivity of the light-shielding photosensitive resin layer. Examples of the light source include known light sources such as an ultra high pressure mercury lamp, a xenon lamp, a carbon arc lamp, and an argon laser. As is described in JP-A No. 6-59119, an optical filter whose transmittance is 2% or less with respect to light having a wavelength of 400 nm or more may be used together.

Development

As a liquid developer, a dilute aqueous solution of an alkaline substance is used. Moreover, the liquid developer may include a small amount of a water-miscible organic solvent. Typical examples of the alkaline substance include alkali metal hydroxides (for instance, sodium hydroxide and potassium hydroxide), alkali metal carbonates (for instance, sodium carbonate and potassium carbonate), alkali metal hydrogen carbonates (for instance, sodium hydrogen carbonate and potassium hydrogen carbonate), alkali metal silicates (for instance, sodium silicate and potassium silicate), alkali metal metasilicates (for instance, sodium metasilicate and potassium metasilicate), triethanolamine, diethanoleamine, monoethanolamine, morpholine, tetraalkylammonium hydroxides (for instance, tetramethylammonium hydroxide) and trisodium phosphate. The concentration of the alkaline substance in the liquid developer is 0.01 to 30% by weight, and pH of the liquid developer is preferably 8 to 14. The characteristics of the liquid developer, such as pH, can be controlled in accordance with the nature such as the oxidation of the light-shielding photosensitive resin layer such that development is conducted by elimination of a film form.

Typical examples of the water-miscible organic solvent include methanol, ethanol, 2-propanol, 1-propanopl, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, $\epsilon$-caprolactone, $\gamma$-butyrolactone, dimethyl formamide, dimethyl acetamide, hexamethyl phosphoramide, ethyl lactate, methyl lactate, $\epsilon$-caprolactam, and N-methyl pyrrolidone. The concentration of the water-miscible organic solvent in the liquid developer is generally 0.1 to 30% by weight.

The liquid developer may include a known surfactant. The concentration of the surfactant in the liquid developer is preferably 0.01 to 10% by weight.

The liquid developer can be used either as a bath liquid or as a spray liquid. In order to remove non-cured portions of the light-shielding photosensitive resin composition layer in a solid form (preferably a film form), a method of scrubbing the light-shielding layer with a rotating brush or a wet sponge in the liquid developer, or a method making use of a spraying pressure when the liquid developer is sprayed is preferably used. The temperature of the liquid developer is preferably in the range of a temperature close to room temperature to 40° C. A washing step can be conducted after the development process.

Drying

After the development process, a heating and drying process is conducted. Namely, a support having a resin layer that has been photo-cured by exposure (hereinafter, referred to as a "photo-cured layer") is heated in an electric furnace or a desiccator, or is heated by irradiating light from an infrared lamp onto the photo-cured layer. The temperature and the time period of heating depend on the composition of the polymerizable composition used and the thickness of the formed layer. However, in general, in order to obtain sufficient solvent resistance and alkali resistance, it is preferable to heat at a temperature in the range of approximately 120 to approximately 250° C., for approximately 10 to approximately 300 minutes.

When a light-shielding layer is formed according to the method of the invention, the optical density of the light-shielding layer per μm of the film thickness is preferably 1 or more. Furthermore, in order to prevent the fine metal particles from fusing during the heating process in preparing a color filter, the content of the fine metal particles in the coloring composition is preferably controlled so that the content of the metal particles contained in the formed light-shielding layer is 10 to 90% by mass and preferably 10 to 80% by mass.

The light-shielding film for a display obtained according to the method of the invention has a light-shielding layer formed by using a coating liquid containing the fine metal particles. The thickness of the light-shielding layer is preferably approximately 0.3 to approximately 2.0 μm. Since the fine metal particles are dispersed in the light-shielding layer of the light-shielding film for a display obtained by the invention, even when a film is thin as mentioned above, sufficient optical density can be obtained.

The swelling degree of the light-shielding film for a display in the invention is preferably 0.5 or less at 25° C.

The swelling degree S mentioned herein is defined as $S=(\Delta d-d)/d$ wherein d represents the dry thickness of a film, and $\Delta d$ represents the thickness of the film when the film has been immersed in distilled water kept at 25° C. for 60 seconds.

In the invention, after the formation of the light-shielding layer and before the exposure thereof, a protective layer may be formed on the light-shielding layer. The protective layer is disposed to block oxygen during the exposure and to increase sensitivity. For this purpose, the protective layer is preferably mainly made of an oxygen-blocking resin such as polyvinyl alcohol. Since the protective layer is unnecessary after the formation of the light-shielding film for a display, it is removed by development. Provision of the protective layer makes it possible to manufacture a light-shielding film for a display with less light exposure.

EXAMPLES

Hereinafter, the present invention will be explained in more detail by way of examples; however, the invention is not restricted to the examples.

Example 1

Manufacture of Silver Particles

Manufacture of Silver-Dispersed Slurry 3,488 g of distilled water was added to 112 g of gelatin, and the resultant mixture was heated to approximately 47° C. to dissolve the gelatin. 4.0 g of calcium acetate and 2.0 g of potassium borohydride were added to the mixture. Immediately after that, a solution made of 6.0 g of silver nitrate dissolved in 1.0 liter of distilled water was rapidly added to the mixture while the mixture was stirred. Distilled water was also added to the resultant mixture to make the total weight of the resultant 5.0 kg. Then, the resultant product was cooled down at a temperature close to a gelation temperature and immersed into cooled water through small holes, and thereby very minute noodle-like materials were formed. These noodle-like materials were supplied as an amplifying catalyst to generate blue silver in a field. For convenience's sake, and in order to prevent the noodle-like materials from forming a fused mass, water was added to the noodle-like materials so that the ratio of water to noodle-like materials became 1:3.

A solution made of 6.5 g of potassium hydroquinone monosulfonate and 0.29 g of KCl dissolved in 81 g of distilled water was added to 650 g of borohydride reduced silver nucleus. The slurry containing the noodle-like mate rials was cooled down to approximately 6° C. The following solutions A and B were manufactured in separate vessels.

A 19.5 g of sodium sulfite (anhydride)
 0.98 g of sodium bisulfite (anhydride)
 122.0 g of distilled water
B 9.75 g of silver nitrate
 122.0 g of distilled water Solutions A and B were mixed, forming white precipitates that disappear when stirring is continued. Immediately after that, the mixture was rapidly added to the slurry including the noodle-like materials for a short period of time (5 minutes or less) while the slurry was stirring. The temperature of the resultant mixture was kept at 10° C. and amplification was allowed to proceed for approximately 80 minutes until all soluble silver salt was reduced on the nucleuses. The resultant blue slurry particles were made to pass through tap water in the form of a slurry in a nylon mesh bag and washed so that washing water passed through the bag for approximately 30 minutes. As a result, all salts could be washed away. In order to obtain a blue silver dispersion containing silver in a concentration of 1.5% by weight when melted, the washed blue silver dispersed in the gel slurry was drained until the total weight of the product became 412 g.

Manufacture of Silver Fine Particles

Six grams of a dispersant (Rapisol B-90 manufactured by Nippon Oil & Fats Co., Ltd.) and 2000 g of a 5 wt % aqueous solution of papain were added to 4000 g of the thus-obtained slurry in which silver was dispersed, and the resultant dispersion was stored at 37° C. for 24 hours. The dispersion was centrifuged at 2000 rpm for 5 minutes to precipitate the silver fine particles. After discarding a supernatant, the precipitate was washed with distilled water to remove a decomposed substance of gelatin decomposed by enzyme. Subsequently, the silver fine particle precipitate was washed with methanol and dried. Approximately 60 g of aggregates of the silver fine particles were obtained. Fifty three grams of the aggregates and 5 g of a dispersant (Solsperse 20000 manufactured by Avecia KK) were mixed with 22 g of methyl ethyl ketone. 100 g of 2 mm glass beads was blended with the resultant mixture and the resultant was dispersed for 3 hours with a paint shaker. Thus, a silver fine particle dispersion liquid A-1 was obtained.

Manufacture of Light-shielding Layer Coating Liquid

The following substances were added to and mixed with the silver fine particle dispersion liquid A-1, and thereby a light-shielding layer coating liquid was obtained.

| | |
|---|---|
| Silver fine particle dispersion liquid A-1 | 40.0 g |
| Propylene glycol monomethyl ether acetate | 40.0 g |
| Methyl ethyl ketone | 37.6 g |
| Surfactant (F176PF, 20%) | 0.1 g |
| Hydroquinone monomethyl ether | 0.001 g |
| Dipentaerythritol hexacrylate | 2.1 g |
| Bis[4-[N-(4,6-bistrichloromethyl-s-triazine-2-yl)phenyl]carbamoyl]phenyl]sebacate | 0.1 g |
| Manufacture of Protective Layer Coating Liquid | |
| Polyvinyl alcohol (PVA205 manufactured by Kuraray Co., Ltd.) | 3.0 g |
| Polyvinyl pyrrolidone (PVP-K30 manufactured by GAF Corporation) | 1.3 g |
| Distilled water | 50.7 g |
| Methyl alcohol | 45.0 g |

The integrants mentioned above were mixed and thereby a protective layer coating liquid was obtained.

Coating of Coating Liquid

A glass substrate was coated with the light-shielding layer coating liquid by means of a spin coater, and the resultant layer was dried at 100° C. for 5 minutes. Subsequently, the dried layer was coated with the protective layer coating liquid by use of the spin coater so that a dry film thickness was 1.5 µm, and the resultant layer was dried at 100° C. for 5 minutes.

Exposure and Development

The resultant was exposed to light from an ultra high pressure mercury lamp at 70 mJ/cm$^2$ from the coated surface side. Then, the resultant was developed (33° C., for 20 seconds) with a liquid developer TCD (an alkali developer manufactured by Fuji Photo Film Co., Ltd.,), and thereby a light-shielding film for a display was obtained.

The light-shielding film for a display thus obtained was evaluated as follows.

Measurement of Film Thickness

The thickness of the light-shielding film for a display was measured according to the following method. A specimen which was coated with a light-shielding layer was exposed to light from the ultra high pressure mercury lamp at 70 mJ/cm$^2$ from the coated surface side, and the film thickness of the specimen was measured with a stylus-type surface roughness measuring device P-1 (manufactured by TENKOP Corp.).

The thickness of the specimen was 0.4 µm.

Measurement of Swelling Degree

The specimen which had been used in the measurement of the film thickness was immersed in distilled water at 25° C. for 60 seconds, and then moisture on the specimen surface was wiped. Thereafter, the film thickness ($\Delta d$) of the specimen was measured by the above method. From the obtained film thickness before immersing (dry film thickness d) and that ($\Delta d$) after immersing, the swelling degree $S (=(\Delta d-d)/d)$ was calculated, which was 0.04.

Measurement of Optical Density

The optical density of the film was measured according to the following method. A light-shielding layer formed on a glass substrate was exposed to light from an ultra high pressure mercury lamp at 70 mJ/cm$^2$ from the coated surface side. Then, the optical density (OD) thereof was measured with a Macbeth densitometer (TD-904 manufactured by Macbeth Corp.). The optical density ($OD_0$) of the glass substrate was separately measured by the same method. The value obtained by subtracting $OD_0$ from OD was regarded as the optical density of the film.

The optical density of the specimen was 3.6.

Example 2

A light-shielding film for a display of Example 2 was manufactured in the same manner as in Example 1, except that a protective layer was not formed on a light-shielding layer.

The film thickness and optical density of the light-shielding layer of the specimen were 0.4 µm and 3.6, respectively. Furthermore, a light-shielding film for a display could not be formed on the specimen through exposure of 70 mJ/cm$^2$ with the ultra high pressure mercury lamp, but a good light-shielding film for a display could be formed through exposure of 500 mJ/cm$^2$.

Example 3

A silver fine particle dispersion liquid A-2 was prepared in the same manner as the preparation of the silver fine particle dispersion liquid A-1, except that Solsperse 20000 (dispersant) was not used during the dispersion of the silver fine particles. A light-shielding film for a display of Example 3 was manufactured in the same manner as in Example 2, except that the silver fine particle dispersion liquid A-2 was used in place of the silver fine particle dispersion liquid A-1.

The film thickness and optical density of the specimen were 0.4 µm and 3.3, respectively. Furthermore, a light-shielding film for a display could not be formed on the specimen through exposure of 70 mJ/cm$^2$ with the ultra high pressure mercury lamp, but a good light-shielding film for a display could be formed through exposure of 500 mJ/cm$^2$.

Example 4

A light-shielding film for a display of Example 4 was obtained in the same manner as in Example 1, except that a curtain coater was used under the following conditions in place of the spin coater.
Slit shape: length of 18 cm and width of 0.2 mm
Distance between slit and substrate: 2 cm
Substrate movement speed: 30 cm/min.

The film thickness and an optical density of the light-shielding layer of the specimen were 0.4 µm and 3.7, respectively. Furthermore, a good light-shielding film for a display was obtained when the exposure was conducted at 70 mJ/cm$^2$ with the ultra high pressure mercury lamp.

Example 5

A light-shielding film for a display of Example 5 was obtained in the same manner as in Example 1, except that an extrusion coater similar to that described in JP-A No. 10-286507 was used in place of the spin coater.

The film thickness and optical density of the specimen were 0.4 µm and 3.7, respectively. Furthermore, a good light-shielding film for a display was obtained when the exposure was conducted at 70 mJ/cm$^2$ with the ultra high pressure mercury lamp.

Comparative Example 1

A light-shielding film for a display of Comparative Example 1 was manufactured in the same manner as in Example 1, except that the following carbon black dispersion liquid B-1 was used in place of the silver fine particle dispersion liquid A-1.
Carbon Black Dispersion Liquid B-1
2.5 g of carbon black (Regal 400 manufactured by Cabot Corporation), 5 g of a dispersant (Solsperse 20000 manufactured by Avecia KK) and 16.4 g of methyl ethyl ketone were mixed. 100 g of 2 mm glass beads was mixed with the resultant mixture and the resultant was dispersed for 3 hours with a paint shaker, and thereby a carbon black dispersion liquid B-1 was obtained.

The film thickness of the light-shielding layer of the specimen was 0.4 µm, but the optical density of the layer was 0.7, which was insufficient as a light-shielding film for a display.

What is claimed is:

1. A method for forming a liquid crystal display comprising:
providing a liquid crystal display substrate; and
forming a light-shielding film for a display on the liquid crystal display substrate by coating the liquid crystal display substrate with a coating liquid containing a binder and fine particles of metal dispersed in the binder, followed by drying,
wherein the average particle diameter of the fine particles of metal is 1 to 3000 nm.

2. A method for forming a liquid crystal display according to claim 1, wherein the fine particles metal in the coating liquid are dispersed with a dispersant.

3. A method for forming a liquid crystal display according to claim 2, wherein the dispersant includes at least one of a surfactant and a polymer.

4. A method for forming a liquid crystal display according to claim 3, wherein the amount of the surfactant used is 0.01 to 30% by weight relative to the fine particles of metal.

5. A method for forming a liquid crystal display according to claim 3, wherein the amount of the surfactant used is 0.1 to 20% by weight relative to the fine particles of metal.

6. A method for forming a liquid crystal display according to claim 3, wherein the amount of the polymer used is 0.01 to 30% by weight relative to the fine particles of metal.

7. A method for forming a liquid crystal display according to claim 3, wherein the amount of the polymer used is 0.1 to 20% by weight relative to the fine particles of metal.

8. A method for forming a liquid crystal display according to claim 1, wherein the fine particles of metal are fine particles of nickel, silver, gold, platinum, copper or an alloy thereof.

9. A method for forming a liquid crystal display according to claim 1, wherein the fine particles of metal are fine particles of silver.

10. A method for forming a liquid crystal display according to claim 1, wherein the average particle diameter of the fine particles of metal is 10 to 250 nm.

11. A method for forming a liquid crystal display according to claim 1, wherein the liquid crystal display substrate is coated with the coating liquid containing the binder and the fine particles of metal by a spin coat method, a curtain coat method, or an extrusion method.

12. A method for forming a liquid crystal display according to claim 1, wherein a protective layer is disposed on the light-shielding film for a display, and exposing the protective layer to light.

13. A method for forming a liquid crystal display comprising:
providing a liquid crystal display substrate; and
forming a light-shielding film for a display on the liquid crystal display substrate by coating the liquid crystal display substrate with a coating liquid containing a binder, fine particles of metal dispersed in the binder and a dispersant, followed by drying,
wherein the average particle diameter of the fine particles of metal is 1 to 3000 nm.

14. A method for forming a liquid crystal display according to claim 13, wherein the dispersant includes at least one of a surfactant and a polymer.

15. A method for forming a liquid crystal display according to claim 14, wherein the amount of the surfactant used is 0.01 to 30% by weight relative to fine particles of metal.

16. A method for forming a liquid crystal display according to claim 13, wherein the amount of the polymer used is 0.01 to 30% by weight relative to the fine particles of metal.

17. A method for forming a liquid crystal display according to claim 13, wherein the fine particles of metal are fine particles of silver.

18. A method for forming a liquid crystal display comprising:

providing a liquid crystal display substrate; and forming a light-shielding film for a display on the liquid crystal display substrate by coating the liquid crystal display substrate with a coating liquid containing a binder, fine particles of metal dispersed in the binder and a dispersant, drying an obtained layer, forming a protective layer on the obtained layer, and exposing the protective layer to light, wherein the average particle diameter of the fine particles of metal is 1 to 3000 nm.

19. A method for forming a liquid crystal display according to claim 18, wherein the fine particles of metal are fine particles of silver.

* * * * *